United States Patent [19]

Saito

[11] Patent Number: 5,355,198

[45] Date of Patent: Oct. 11, 1994

[54] EXPOSURE DEVICE HAVING LIGHT SHADING MEMBERS FOR CORRECTING LIGHT DISTRIBUTION OF A PROJECTION MECHANISM IN A COPIER

[75] Inventor: Taku Saito, Hachioji, Japan

[73] Assignee: Konica Corporation, Tokyo, Japan

[21] Appl. No.: 106,818

[22] Filed: Aug. 16, 1993

[30] Foreign Application Priority Data

Aug. 31, 1992 [JP] Japan .................................. 4-255533

[51] Int. Cl.$^5$ ........................ G03G 15/04; F21V 17/02
[52] U.S. Cl. ...................................... 355/243; 355/71; 359/738; 362/321
[58] Field of Search ............... 355/218, 229, 237, 243, 355/52, 58, 71; 359/738, 739; 362/321, 268, 325

[56] References Cited

U.S. PATENT DOCUMENTS

| 4,607,943 | 8/1986 | Yoshioka et al. | 355/243 |
| 4,806,989 | 2/1989 | Saito et al. | 355/71 X |
| 5,012,277 | 4/1991 | Hyodo et al. | 355/71 X |

FOREIGN PATENT DOCUMENTS

| 56-125773 | 10/1981 | Japan . |
| 57-92348 | 6/1982 | Japan . |
| 57-154265 | 9/1982 | Japan . |
| 58-68062 | 4/1983 | Japan . |
| 60-80828 | 5/1985 | Japan . |
| 63-106639 | 5/1988 | Japan . |
| 63-231328 | 9/1988 | Japan . |

Primary Examiner—R. L. Moses
Assistant Examiner—Nestor R. Ramirez
Attorney, Agent, or Firm—Frishauf, Holtz, Goodman & Woodward

[57] ABSTRACT

An exposure device for use in a copier having a magnification mode, includes a light source having a uniform non-shaded light distribution characteristic when a predetermined magnification ratio is selected; a lens moving mechanism for focusing an image on a photoreceptor so that a magnification of an image can be changed by movement of a lens while a light shading member is being rotated; a rotatable light shading member which is rotatable about a shaft; and a light shading member rotation mechanism for correcting a light distribution of an image light on a photoreceptor surface relative to a variable magnification ratio of the lens while the light shading member is being rotated. The light shading member includes two thin light-shading plates which have a cross section along the optical path that is unequally varied at adjoining portions thereof when the light shading member is rotated. If two surfaces of the light shading plates are successively placed on the optical path at different angles crossing the optical axis and if the amplification ratios for each of the plates is selected to be larger and smaller respectively than a predetermined ratio, then the shapes projected on a surface perpendicular to the optical axis for each plate are formed so that the light amount distribution on the photoreceptor provided by each plate is made uniform by the light shading member rotation mechanism.

4 Claims, 10 Drawing Sheets

EXPOSURE DEVICE HAVING LIGHT SHADING MEMBERS FOR CORRECTING LIGHT DISTRIBUTION OF A PROJECTION MECHANISM IN A COPIER

BACKGROUND OF THE INVENTION

The present invention relates to an exposure device which is applied to a projection mechanism of a copier, and especially to an exposure device having a light shading member to correct light distribution.

In the projection mechanism of a copier, a lens is essential to form a projected image into an image on a photoreceptor, which is an image carrier. The lens has the following characteristics: luminous flux density on an image point located outside of an optical axis is reduced in proportion to $\cos^4\theta$ of the luminous flux density of the image point located on the optical axis, which is the "$\cos^4\theta$ law". Accordingly, in a conventional copier which can magnify a document image, light distribution is adjusted when a side of a slit, which is an optical path regulation member, is provided in the manner that the slit can advance or retreat with respect to the optical path; or when a light shading member, which is different from the slit, is provided in the manner that it can move perpendicularly to the optical axis.

Further, in order to properly correct a light amount with respect to all the projection magnification ratios, the following exposure device has been proposed, for example, as disclosed in Japanese Patent Publication Open to Public Inspection No 63-106639: the exposure device has; a light shading member which is rotated around the shaft, which is provided in the direction perpendicular to the optical axis and provided in the longitudinal direction of a cross section of the optical path with respect to the optical path regulated in the form of a slit by an optical path regulation member; and a light shading member rotating mechanism which corrects the distribution of the light amount on the photoreceptor surface of an image light passing through the lens, corresponding to the magnification ratio of the lens while the light shading member is being rotated.

In the conventional exposure device, a light source having the distribution characteristics of light distribution in which the distribution of the light amount on the photoreceptor surface is uniform at a predetermined magnification ratio when no shading is conducted. As a light shading member, a light shading plate is provided, the thickness of which is thin, and in which the length in the cross direction of the cross section of the optical path is not uniformly changed in the adjoining positions when the plate is rotated.

A predetermined magnification ratio of the lens can be arbitrarily determined like, for example, the maximum magnification ratio, or minimum magnification ratio, and further, an intermediate magnification ratio having the value of 1. However, in any case, the light source should have light distribution characteristics in which the light amount distribution on the photoreceptor surface becomes uniform at the magnification ratio when shading is not conducted. When the predetermined magnification ratio is the maximum magnification ratio, the light amount of the peripheral portion apart from the optical axis is most conspicuously lowered. Accordingly, in order to make the light amount distribution uniform, it is necessary that the light amount of the peripheral portion of the light source is greatly increased. When the predetermined magnification ratio is the minimum magnification ratio, the light amount of the peripheral portion is decreased by the least amount, so that the light source has a flat distribution characteristic of light distribution. However, the light amount of the peripheral portion is gradually lowered as the magnification ratio is increased, and the light amount in the center of the optical axis is gradually increased compared with the peripheral light amount. Accordingly, the light shading plate is used so that the light amount of the central portion, which is relatively increased as the magnification is increased, is decreased. Further, when the predetermined magnification ratio is the intermediate magnification ratio having the value of 1, a rotational light shading member in which the light shading plates are combined is provided, and thereby, variation of the entire light amount is decreased through all the magnification range. However, since it is necessary that a shaded light amount of the central portion is equal to that of the peripheral portion at the life-size magnification ratio, a projected area of the light shading plate at that time is maximum, and lowering of the entire light amount is maximum.

However, in the above-described conventional exposure device, when, for example, the distribution characteristic of the light distribution of the light source is set to that of the maximum magnification ratio, it is necessary that an emitted light amount of the peripheral portion is greatly larger than that of the optical axis portion. When the distribution characteristic of the light distribution of the light source is set to that of the minimum magnification, which is comparatively flat, and the light amount of all portions is appropriate at the minimum magnification ratio, it is necessary to shade the light amount of the central portion which is relatively increased as the magnification ratio is increased, and therefore, the light amount of all portions is insufficient, which is disadvantageous. Further, when the distribution characteristic of the light distribution of the light source is set to that of the life-size magnification ratio, the shaded light amount is maximum at the life-size magnification ratio, which is most frequently used, and when the light amount is set to the foregoing, the light amount other than during life-size magnification is excessive, which is disadvantageous.

SUMMARY OF THE INVENTION

The object of the present invention is to provide an exposure device in which the rate of change of the distribution characteristic of the light distribution is small, the change of the entire light amount is small when the magnification ratio is changed, and the appropriate entire light amount and excellent light distribution can be obtained at all magnification ratios. A further object of the present invention is to provide a light shading member rotational mechanism which is moved together with the movement, in the direction perpendicular to the optical axis, of a lens movement mechanism, so that a cam device for use in light distribution correction can be made small, and thereby, inferior light distribution correction due to deviations of the focal distance can be decreased. Another object of the present invention is to provide a light shading member rotational mechanism which is more simple.

In order to accomplish the foregoing objects, the first embodiment of an exposure device of the present invention comprises: a light source by which an original document is illuminated; an optical path regulation member to regulate a cross section of the optical path from the light source in the form of a slit; a photoreceptor on which is carried an image of the image light which passes through the optical path regulation member; a lens provided on the optical path between the photoreceptor and the original document; a lens movement mechanism by which the image is formed on the photoreceptor in the manner that the magnification of the image can be changed when the lens is moved in the direction of the optical axis and in the direction perpendicular to the optical axis; a light shading member which is rotated around the shaft, provided in the direction perpendicular to the optical axis and in the direction of the length of the cross section of the optical axis; and a light shading member rotational mechanism to correct the amount of light distribution of the image light on the photoreceptor surface with respect to the variable magnification ratio of the lens movement mechanism while the light shading member is being rotated, wherein the image light passes through the lens. In the foregoing exposure device, the light source has the light distribution characteristic by which the light amount distribution on the photoreceptor surface is made uniform at a predetermined magnification ratio when no shading is conducted. The light shading member is composed of a plurality of thin light shading plates in which the length in the cross direction of the cross section of the optical path is irregularly changed at the adjoining positions when the light shading member is rotated, wherein the light shading plates are integrally provided or integrally operated with each other.

When the surface of one of the plurality of light shading plates is placed on the optical path at an angle crossing the optical axis and one of magnification ratio larger than the predetermined magnification ratio is selected, the shape projected on the surface perpendicular to the optical axis is formed so that the light amount distribution on the photoreceptor is made uniform by means of the light shading member operational mechanism. When the surface of another one of the plurality of light shading plates is placed on the optical path at another angle crossing the optical axis and another magnification ratio smaller than the predetermined magnification ratio is selected, the shape projected on the surface perpendicular to the optical axis is formed so that the light amount distribution on the photoreceptor is made uniform by means of the light shading member operational mechanism.

Further, in the exposure device of the second embodiment, the light shading member rotational mechanism comprises: a cam device by which the information of the shape is given when the lens movement mechanism is moved in the direction perpendicular to the optical axis; and an oscillating plate which connects a follower of the cam device with the light shading member and can rotate the plurality of light shading plates. Further, the exposure device of the third embodiment is as follows: the oscillating plate is located in parallel with the shaft positioned near the optical axis of the light shading member, located on almost the optical axis, and has the rotation center positioned at the side of the lens; the connection point of the oscillating plate and the light shading member is positioned opposed to the rotation center with respect to the shaft in the exposure device of the second embodiment.

In the exposure device of the first embodiment, the cross section of the optical path from the light source which illuminates the original document is regulated by the optical path regulating member in the shape of the slit, and the image light illuminates the photoreceptor through the light shading member and lenses provided on the optical path, so that the image is carried on the photoreceptor. The lens can be moved in the direction of the optical axis or in the direction perpendicular to the optical axis by the lens movement mechanism, and thereby, the magnification ratio of the image on the photoreceptor can be changed. The light shading member is rotated around the shaft which is provided in the direction perpendicular to the optical axis, and in the direction of the length of the cross section of the optical axis. When the light shading member is rotated corresponding to the magnification ratio of the lens movement mechanism, the light amount distribution of the image light passing through the lens on the photoreceptor surface is corrected. This correction method will be explained as follows. The light source has the light distribution characteristic in which the light amount distribution on the photoreceptor is uniform at a predetermined magnification ratio when no shading is conducted. When a magnification ratio is larger than the predetermined magnification ratio, the surface of one light shading plate is rotated to an angle crossing the optical axis, and the light amount distribution on the photoreceptor is uniformly formed corresponding to the shape of the light shading plate projected on the surface perpendicular to the optical axis. When the magnification ratio is smaller than a predetermined magnification ratio, the surface of another light shading plate is rotated to an angle crossing the optical axis, and the light amount distribution on the photoreceptor is uniformly formed similarly. When the magnification ratio is a predetermined value, no shading is conducted, and all the light shading plates are positioned in parallel with the optical axis.

The exposure device of the foregoing second embodiment is structured as follows: in order to rotate the light shading plate to a predetermined angle, the cam device is provided so that the information of the shape can be obtained according to the movement in the direction perpendicular to the optical axis of the lens movement mechanism; and the follower of the cam device is connected with the light shading member by the oscillating plate, and thereby, a plurality of the light shading plates are respectively rotated. Further, the exposure device of the third embodiment is structured as follows: the rotation center of the oscillating plate is provided at the side of the lens; and the movement of the oscillating plate is transferred to the light shading member at the connected point located outside of the shaft of the light shading member. Accordingly, since the radius of the rotation of the oscillating plate is larger than that of the light shading member, the rotational angle of the light shading member connected with the oscillating plate becomes large even when the oscillating plate is slightly oscillated.

DETAILED DESCRIPTION OF THE PREFERRED EMBODIMENT

Figure 1:
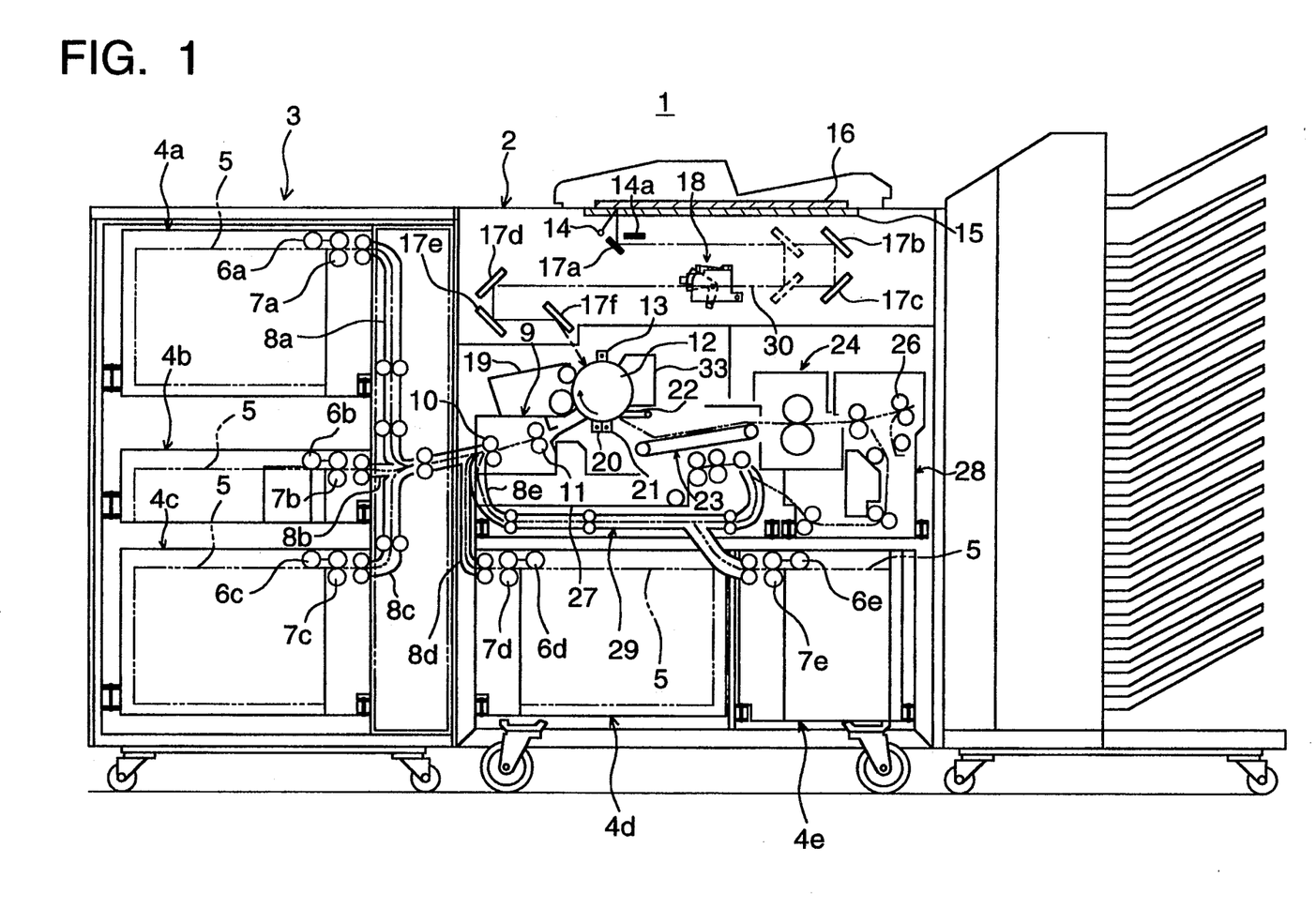
FIG. 1 is a view showing a general structure of a copier in which an exposure device is accommodated.
Figure 2:
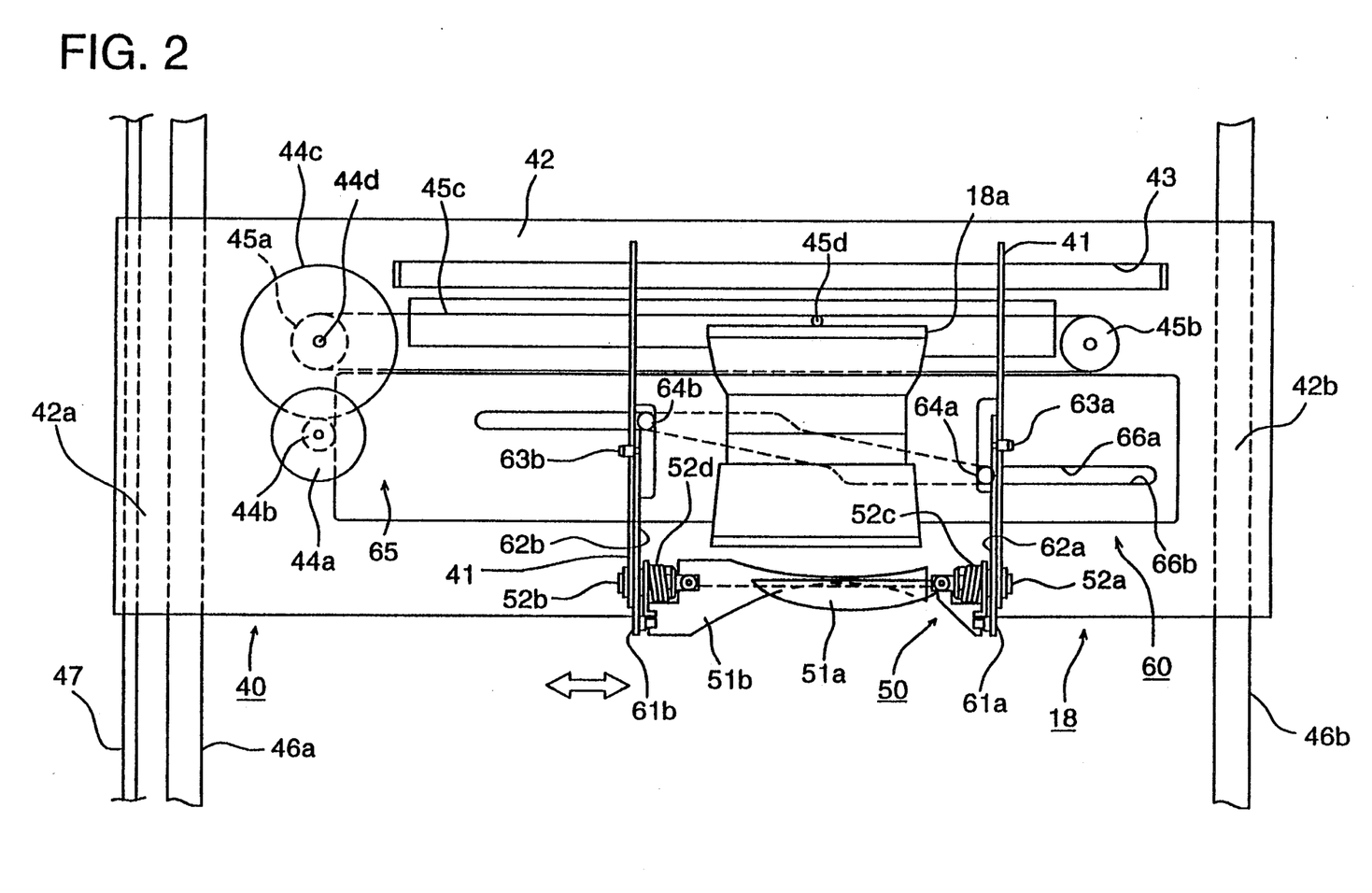
FIG. 2 is a plan view of a lens, its movement mechanism and a light shading member rotational mechanism.
Figure 3:
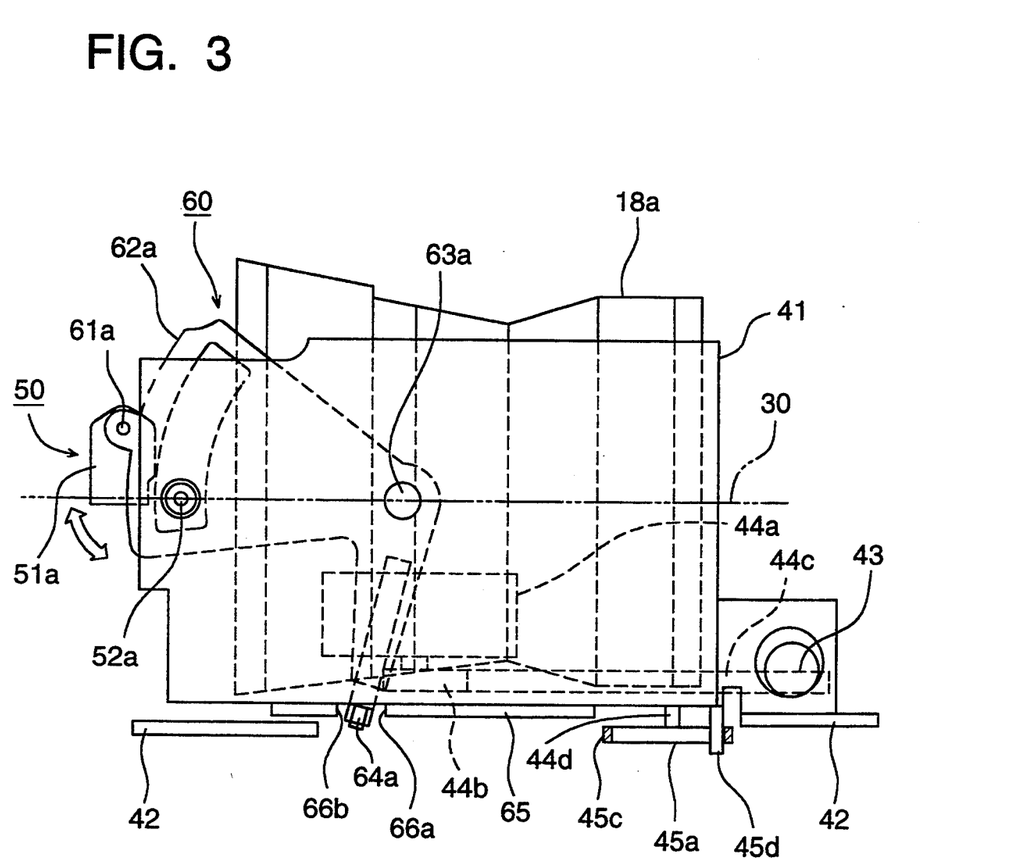
FIG. 3 is a side view of the lens, its movement mechanism and the light shading member rotational mechanism.
Figure 4:
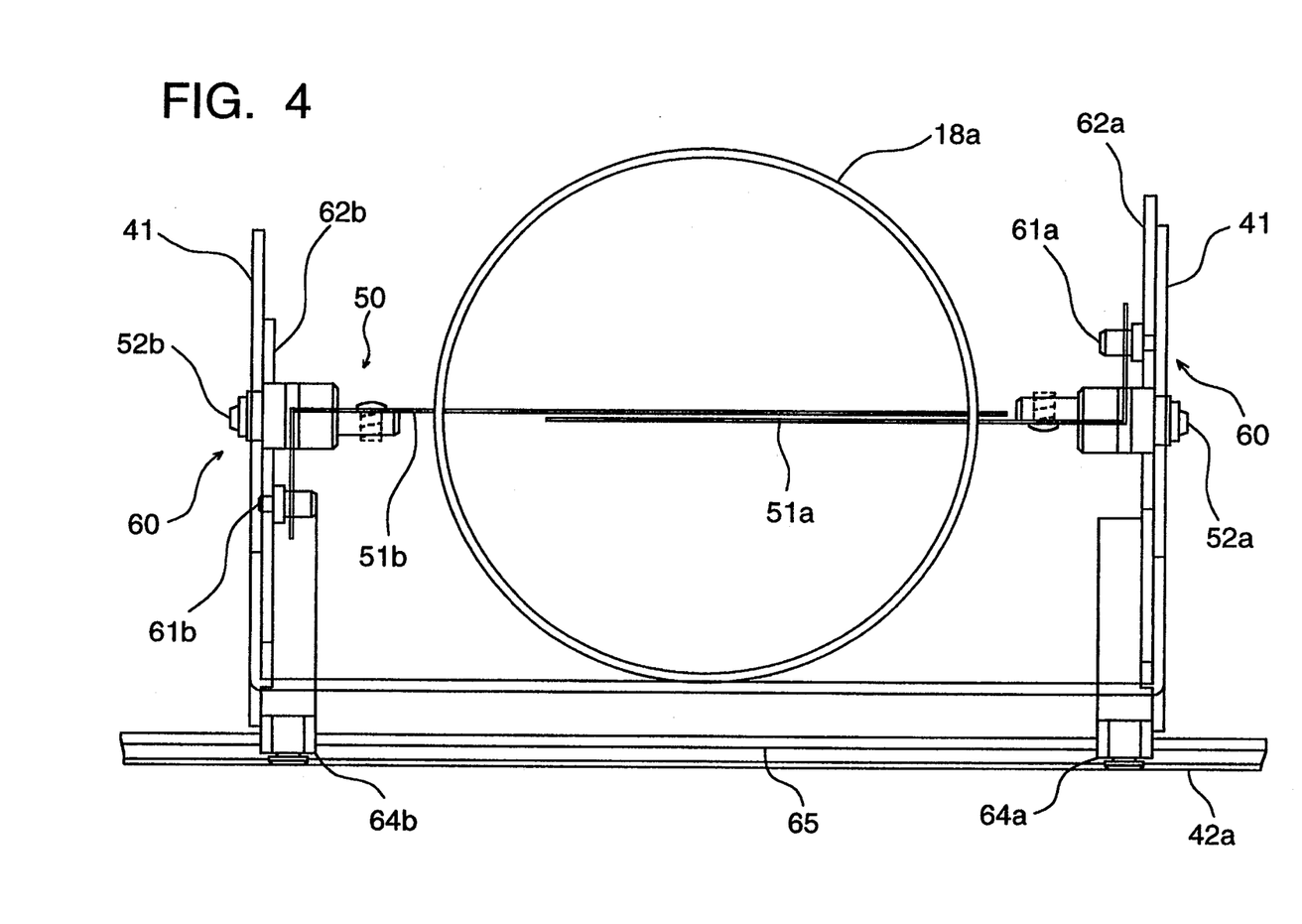
FIG. 4 is a front view of the lens, its movement mechanism and the light shading member rotational mechanism.
Figure 5:
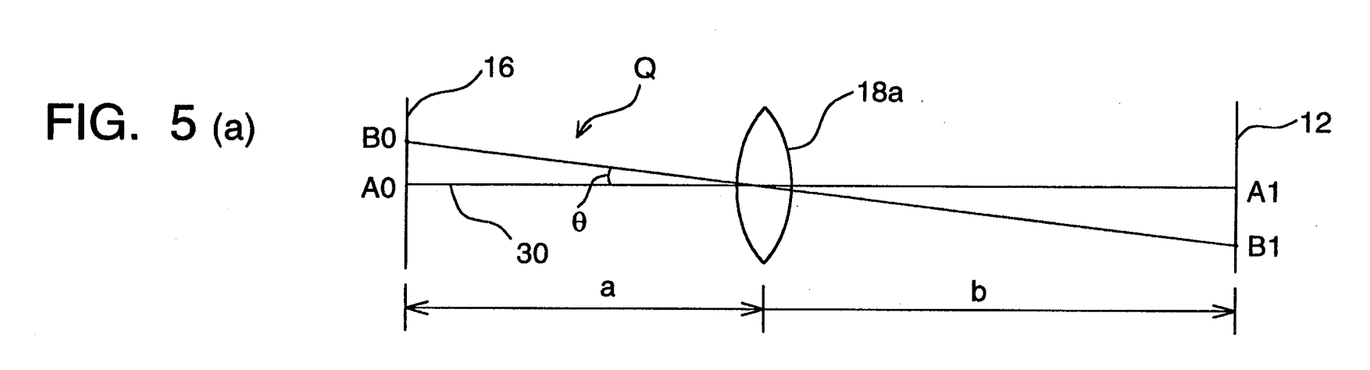
FIGS. 5(a) and 5(b) are illustrations of the distribution characteristic of light distribution.

Referring to the attached drawings, an embodiment of an exposure device of the present invention will be described as follows. FIG. 1 is a view showing a general structure of a copier in which an exposure device is accommodated. FIG. 2 is a plan view of a lens, its movement mechanism and a light shading member rotational mechanism. FIG. 3 is a side view of the lens, its movement mechanism and the light shading member rotational mechanism. FIG. 4 is a front view of the lens, its movement mechanism and the light shading member rotational mechanism. FIGS. 5(a) and 5(b) are illustrations of the distribution characteristic of light distribution. A copier 1 has an apparatus main body section 2 and a sheet feed unit 3 connected with the apparatus main body section 2, and sheet feed stages are respectively provided to them. In the sheet feed unit 3, the first sheet feed stage 4a, the second sheet feed stage 4b, and the third sheet feed stage 4c are provided from the top, and a transfer sheet 5 is accommodated in each stage. Sheet feeding rollers 6a, 6b, and 6c are provided above the upper surface of the transfer sheet 5 in sheet feed stages 4a, 4b and 4c, and the transfer sheet 5 is intermittently fed. Multi-feed prevention means 7a, 7b and 7c are respectively provided to sheet feed rollers 6a, 6b and 6c, and the transfer sheets 5 are sent to the next process one by one. Similarly, the fourth sheet feed stage 4d and the fifth sheet feed stage 4e are provided in the apparatus main body 2, and respectively accommodate the transfer sheet 5 therein. Sheet feed rollers 6d, 6e and multi-feed prevention means 7d and 7e are also provided in those sheet feed stages 4d and 4e. The transfer sheet 5 sent from each sheet feed stage is respectively guided to guide plates 8a, 8b, 8c, 8d, and 8e, and is conveyed to a second sheet feed section 9 which is accommodated in the apparatus main body 2 and of which a sheet feed device is composed. The second sheet feed section 9 is arranged just before a transfer processing section, and has a buckling roller 10 and a registration roller 11. The registration roller 11 operates as follows: the transfer sheet 5 is pushed to the roller 11 and stops; thereby skew of the leading edge of the transfer sheet 5 is corrected; and the transfer sheet 5 is sent to a transfer area in the transfer processing section after a predetermined period of time has passed.

A photoreceptor 12, of which the transfer processing section is composed, is uniformly charged by a charging electrode 13. Reflected light, that is, image light obtained when a light source 14 irradiates an original document 16 on a platen glass 15, passes through a slit plate 14a as an optical path regulating member; its optical path is changed by mirrors 17a, 17b and 17c; it passes through a lens mechanism for image formation 18; its optical path is further changed by mirrors 17d, 17e and 17f; and it irradiates the peripheral surface of a photoreceptor 12, and a latent image is formed thereon. The latent image is developed by developing units 19, and a toner image is formed. The registration roller 11 is driven in timed relation with the rotation of the photoreceptor 12; transfer sheet 5 is sent to a transfer electrode 20 and a separation electrode 21; and the toner image is transferred to the sheet. After that, the transfer sheet 5 is separated from the photoreceptor 12 by a separation claw 22, and conveyed to a fixing unit 24 in the next process by a conveyance unit 23. A cleaning unit 33 is provided downstream of the separation claw 22 around the photoreceptor and cleans the surface of the photoreceptor 12 after a transfer operation has been completed; and the surface of the photoreceptor 12 is charged again by the charging electrode 13 for the next image formation. The toner image is fixed on the transfer sheet 5 which is heated and pressurized in the fixing unit 24. When single-sided copying is carried out, the transfer sheet 5 is sandwiched by conveyance rollers 26 and conveyed to a sheet delivery tray, not shown in the drawings. When double-sided copying is carried out, the transfer sheet 5 is conveyed to an automatic reversal sheet delivery unit 28 by which the conveyance path of the transfer sheet 5 is connected with a tray 27, into which the transfer sheet 5, on which single-sided copying has been carried out, is temporarily stored before being fed to the conveyance roller 26. The transfer sheet 5 which is temporarily stored into the tray 27 is sent out again and conveyed to the third sheet feed section 9 through a conveyance path 29 and a guide plate 8e. The transfer sheet 5 which is housed in the fifth sheet feed stage 4e is also conveyed on this conveyance path 29.

In this copier 1, when the copy magnification ratio is changed, the lens mechanism 18 and mirrors 17b, 17c are moved to appropriate positions. The light source 14 of the copier 1 has the specific distribution characteristic of light distribution as shown in FIG. 5(a). The distribution characteristic of light distribution will be explained as follows. At first, referring to FIG. 5(a), the foregoing "$\cos^4\theta$ law" will be described as follows.

When the lens 18a is located at the position apart by a distance "a" from the original document 16, and an image of the original document 16 is formed on the peripheral surface of the photoreceptor 12 located apart by a distance "b" from the lens 18a, a light amount at a point A1 on the photoreceptor 12, onto which the light at a point A0 located on the original document 16 on an optical axis 30 is projected, is compared with a light amount at a point B1 on the photoreceptor 12, onto which the light at a point B0 located on the original document 16 is projected. At this time, when an angle, at which the light is incident on the lens 18a from the point B0 with respect to the optical axis 30 of the lens 18a, is defined as $\theta$, the light amount at the point B1 is $\cos^4\theta$ times the light amount at the point A1. The more the point B0 is separated from the optical axis 30, the more greatly the light amount at the point B1, which is projected onto the photoreceptor 12, is decreased. Here, the larger the magnification ratio becomes, the smaller the distance a from the lens 18a to the original document 16 is. The lens 18a is moved to the position closest to the document 16 at the largest magnification ratio. Accordingly, at this time, the largest angle $\theta$ is provided, and the largest decrease of the light amount appears on the peripheral portions. On the contrary, at the time of the smallest magnification ratio, the distance a becomes larger, and the smallest angle $\theta$ is provided. Accordingly, the smallest decrease of the light amount on the peripheral portions is obtained at the smallest magnification ratio.

In this copier 1, the light source 14 has the distribution characteristic of the light distribution in which the light amount distribution on the peripheral surface of the photoreceptor 12 is uniform at a predetermined magnification ratio when no shading is carried out. Here, a predetermined magnification ratio is set to 1. In FIG. 5(b), the light source 14, that is, the distribution characteristic of the light distribution on the original document 16 is expressed by a curve Q, and the light amount distribution characteristic on the photoreceptor 12 is expressed by a linear line R. The light amount emitted from the light source 14 is smallest on the optical axis 30, and the nearer to the peripheral portion the position is, the larger the light amount becomes. The light amount on the photoreceptor 12 at the magnification ratio is constant irrespective of the distance from the optical axis 30.

Next, the lens mechanism 18 will be described as follows. The lens mechanism has: a lens movement mechanism 40 by which the lens 18a is moved in the direction of the optical axis and in the direction perpendicular to the optical axis; a light shading member 50 which is rotated in the direction perpendicular to the optical axis 30, and rotated around a shaft provided in the longitudinal direction of the cross section of the optical path which is formed in the shape of a slit; and a light shading member rotational mechanism 60 by which the distribution of the light distribution on the peripheral surface of the photoreceptor 12 is corrected corresponding to the magnification ratio of the lens moving mechanism 40 while the light shading member 50 is being rotated.

At first, the lens moving mechanism 40 will be described as follows. A guide rail 43 which is fixed to a moving plate 42 and provided in the direction perpendicular to the optical axis is inserted into a lens holder 41 by which the lens 18a is held. A driving motor 44a, a pinion 44b which is successively connected with the motor 44 and rotated thereby, and a reduction gear 44c are provided near one end portion of the moving plate 42, and a belt drive pulley 45a is firmly provided to a shaft 44d of the reduction gear 44c. A belt 45c is stretched between a driven pulley 45b provided near the other end portion of the moving plate 42 and the belt drive pulley 45a. A pin 45d connected with the lens holder 41 is provided to the belt 45c. Accordingly, when the driving motor 44a is rotated a predetermined number of rotations in the predetermined direction according to a drive signal sent from a drive control means, not shown in the drawings, the lens holder 41 is moved in the direction perpendicular to the optical axis corresponding to the rotation of the belt 45c. Both the side portions 42a and 42b are respectively supported by guide rails 46a and 46b which are provided in the apparatus main body portion 2 in parallel with the optical axis 30, and the side portion 42a is connected with a belt 47 which is rotated by a motor which is not shown in the drawings. When the belt 47 is driven a predetermined distance in a predetermined direction by a drive signal sent from the drive control means which is not shown in the drawings, the moving plate 42 is moved in the direction perpendicular to the optical axis.

Figure 6:
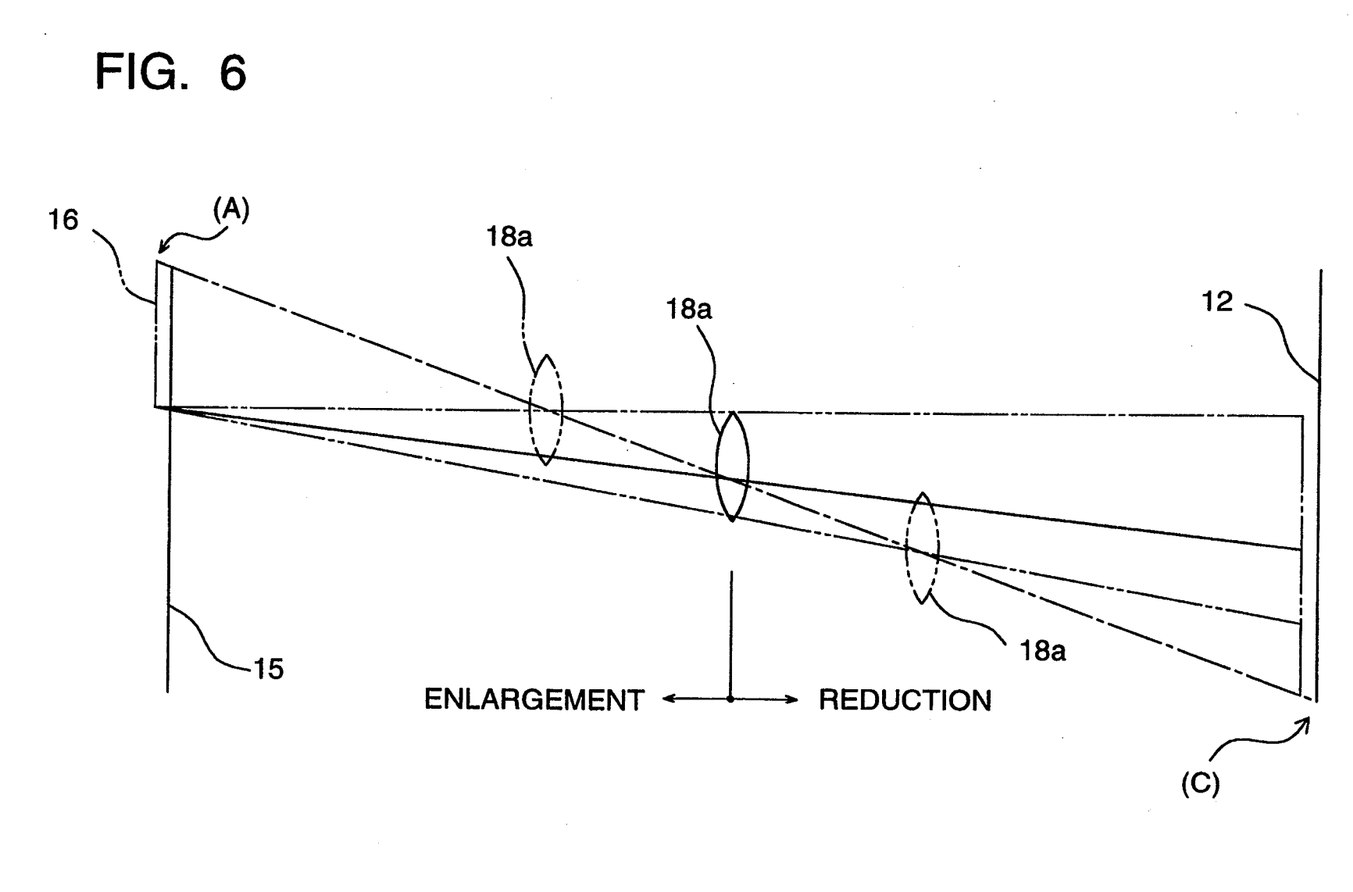
FIG. 6 is an illustration of lens movement when one side of the lens movement mechanism is a reference line.

The position of the lens 18a is determined by the lens moving mechanism 40 when one side of the lens moving mechanism is used as a reference. When the lens is moved as shown in FIG. 6, the magnification ratio is changed to a predetermined value. FIG. 6 is an illustration showing the lens movement when the one side is used as a reference. The original document 16 on the platen glass 15 is placed according to a document placement reference (A). However, the image light on the photoreceptor 12 is entirely irradiated according to a one-side reference (C). Accordingly, the lens 18a is moved on a line by which the document placement reference (A) is connected with the one-side reference (C). In FIG. 6, a real line shows the case of life-size magnification, a one-dotted chain line shows the case of enlargement, and a two-dotted chain line shows the case of reduction. The lens 18a is moved a predetermined distance in the direction of the optical axis and in the direction perpendicular to the optical axis by the lens moving mechanism 40, and a predetermined copy magnification ratio is realized.

Next, the light shading member 50 and the light shading member rotational mechanism 60 will be described as follows. The light shading member 50 has a light shading member for enlargement 51a and a light shading member for reduction 51b which are thin metallic plates, on the surface of which black matting processing is conducted. These light shading plates 51a and 51b are rotatably provided respectively to the lens holder 41 around shafts 52a and 52b. The rotation center of light shading plates 51a and 51b exists on the optical axis of the lens 18a or near the optical axis 30; the rotation center crosses the optical axis 30 at right angles; and further the center of the axis is in parallel with the longitudinal direction of the slit of the slit plate 14a. A fitting portion between the light shading plate 51a and the shaft 52a, and the fitting portion between the light shading plate 51b and the shaft 52b are respectively urged by the elasticity of torsion springs 52c and 52d which are respectively wound around shafts 52a and 52b, and the rotational force is given to each shaft in the direction different from each other. For example, the light shading plate for enlargement 51a is urged downward. In contrast to this, the light shading plate for reduction 51b is urged upward.

Light shading plates 51a and 51b have the following shapes: a shape in which the length in the cross direction of a cross section of the optical path is unevenly changed in the adjoining position when the plates are rotated; specifically, the shape in which the width of the light shading plate for enlargement 51a is wide in the central portion of the plate, and gradually becomes narrower in the peripheral portion; and reversely, the width of the light shading plate for reduction 51b is narrow in the central portion, and gradually becomes wider in the peripheral portion. When these light shading plates 51a and 51b are rotated, and cross the optical axis 30, light beam flux of the central portion of the optical path, or that on both sides of the optical path is shaded. However, when the surface of the light shading plate is in parallel with the optical axis 30, the light beam flux is scarcely shaded.

The light shading member rotational mechanism 60 has a mechanism by which light shading plates 51a and 51b, to which the rotational force is given, are rotated to a predetermined angle according to the position of the lens 18a. End portions of light shading plates 51a and 51b are connected with oscillating plates 62a and 62b, the surface of which is C-shaped, through operation pins 61a and 61b. Oscillating plates 62a and 62b are in parallel with the shafts 52a and 52b which are the rotational center of the light shading plates 51a and 51b, located almost on the optical axis, and are supported by the axes of rotational center of the oscillating plate 63a and 63b located at side portions of the lens 18a. The axes of the rotational center of the oscillating plates 63a and 63b are rotatably supported by the lens holder 41. Operation pins 61a and 61b, by which oscillating plates 62a and 62b are connected with light shading plates 51a and 51b, are located at the position opposite to the axes of the rotational center of the oscillating plates 63a and 63b with respect to the shafts 52a and 52b. Accordingly, the radiuses of rotation of oscillating plates 62a and 62b are larger than those of light shading plates 51a and 51b, so that the light shading plates 51a and 51b can be largely rotated even when the oscillation is small.

Bar-shaped cam followers 64a and 64b are fixed to other ends of oscillating plates 62a and 62b, and are respectively contacted with a cam groove for enlargement 66a and a cam groove for reduction 66b of a light distribution correction cam 65 provided under the lower surface of the lens 18a. The cam followers 64a and 64b are respectively contacted with the cam groove for enlargement 66a and the cam groove for reduction 66b, which are oppositely provided to cam followers, by the rotational force in different directions to which light shading plates 51a and 51b are urged.

Figure 7:
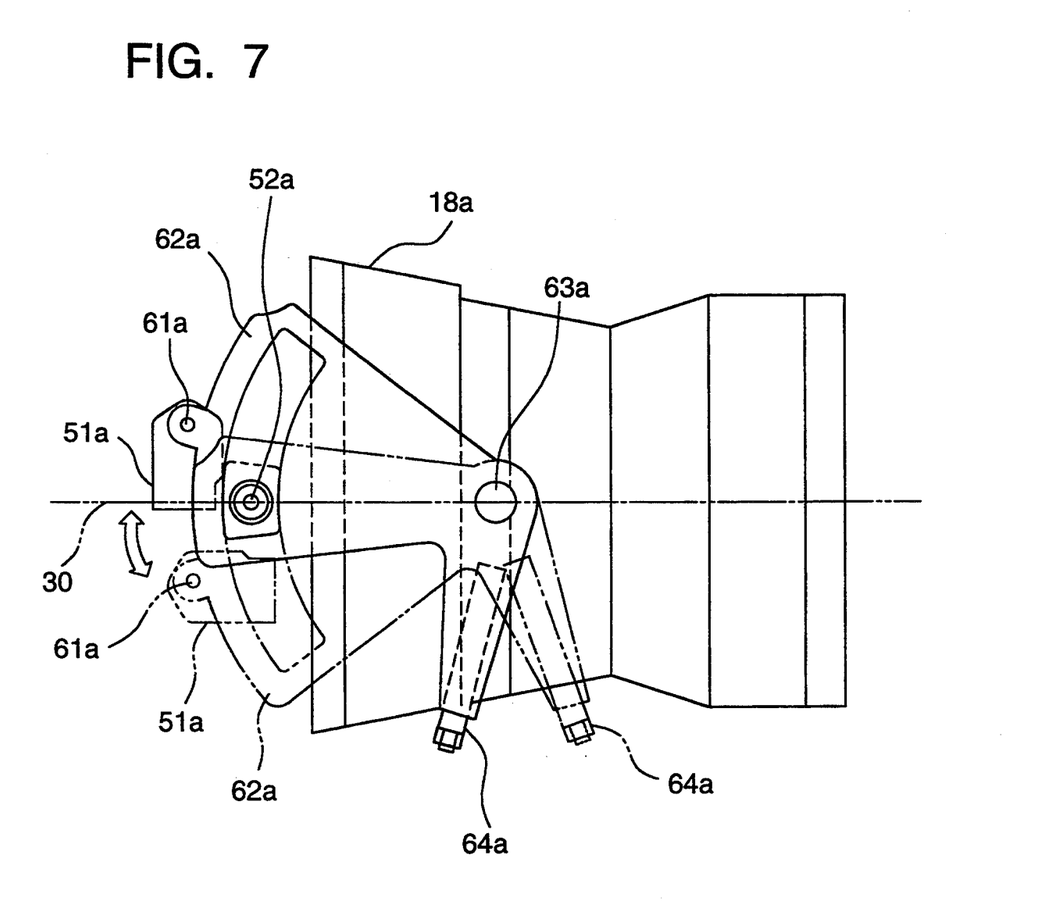
FIG. 7 is a side view showing an operation of a light shading plate for enlargement copy.
Figure 8:
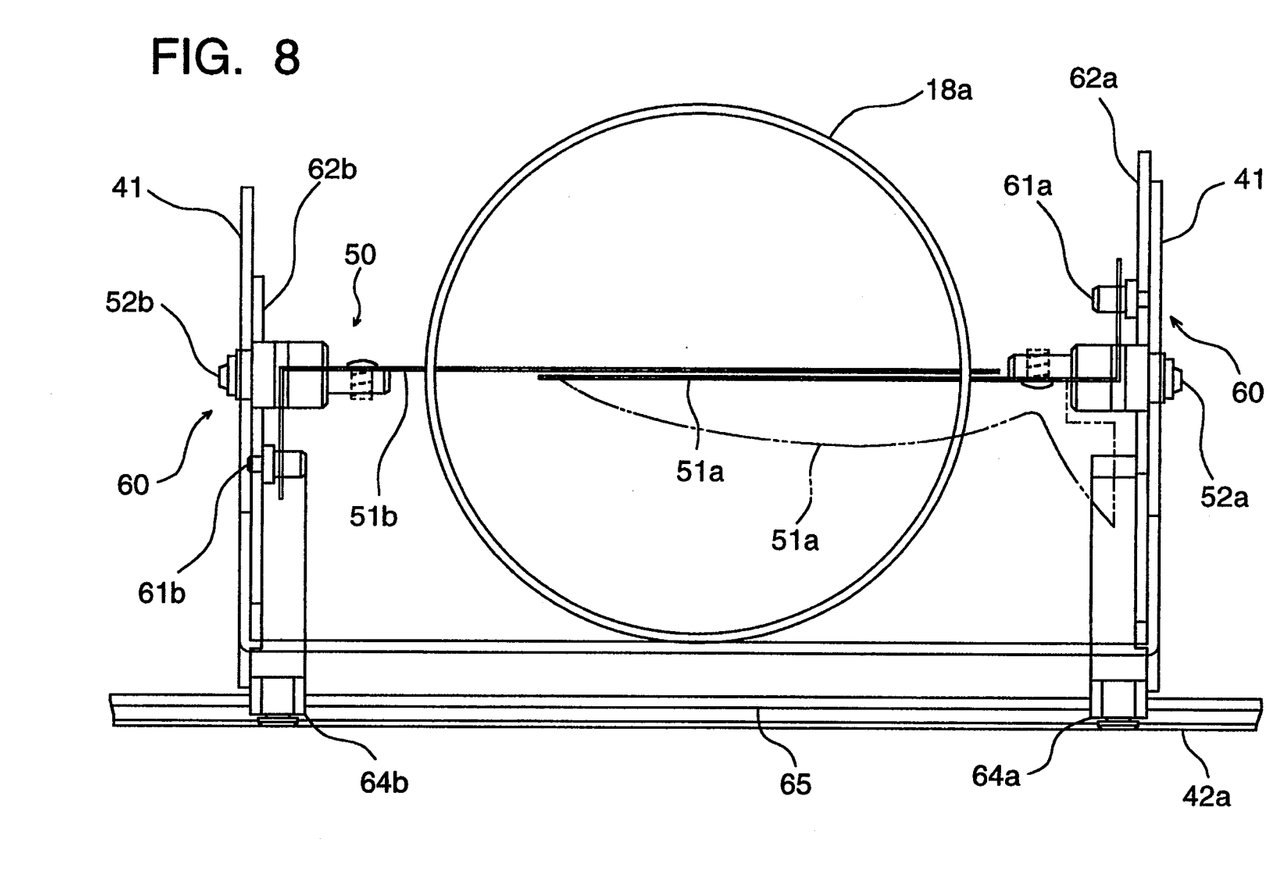
FIG. 8 is a front view showing an operation of a light shading plate for enlargement copy.
Figure 9:
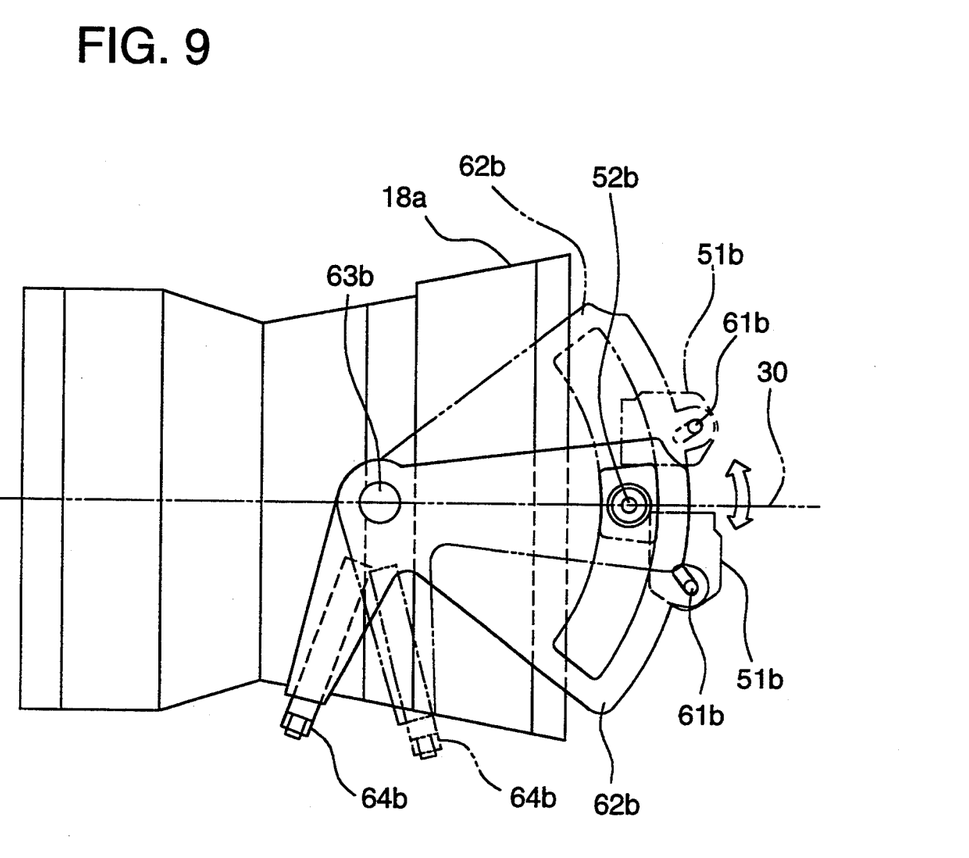
FIG. 9 is a side view showing the operation of the light shading plate for reduction copy.
Figure 10:
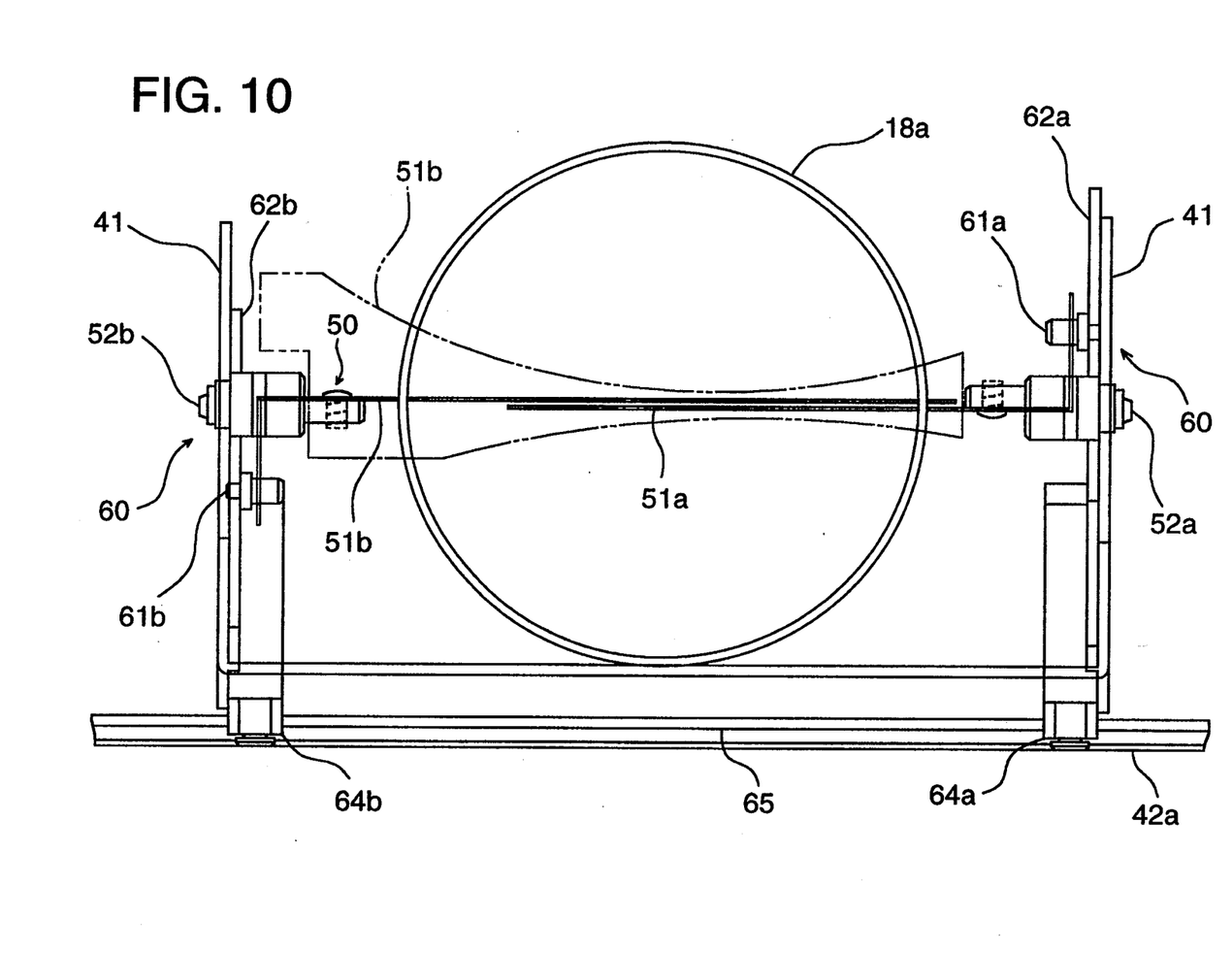
FIG. 10 is a front view showing the operation of the light shading plate for reduction copy.

Next, referring to FIG. 7 to FIG. 10, operations of the light shading member 50 and the light shading member rotation mechanism 60 will be explained as follows. FIG. 7 is a side view showing the operation of the light shading plate for enlargement 51a, and FIG. 8 is a front view showing the operation of the light shading plate for enlargement 51a. FIG. 9 is a side view showing the operation of the light shading plate for reduction 51b, and FIG. 10 is a front view showing the operation of the light shading plate for reduction 51b. In this example, since the light source 14 has the distribution characteristic of the light distribution which is uniform when the magnification ratio is 1, and no shading is conducted, both the light shading plates 51a and 51b are in parallel with the optical axis 30 at the time of life-size magnification as shown in FIG. 4. When the magnification ratio is gradually increased from the above conditions, the light amount around the optical axis is relatively increased as compared with the light amount of the peripheral portions according to the "cos$^4\theta$ law". Accordingly, it is necessary to decrease the light amount around the central portion, which is relatively increased, by rotating the light shading plate for enlargement 51a. The cam follower 64a, which follows the shape of the cam groove for enlargement 66a, is operated as follows. The oscillating plate 62a is rotated downward; the operation pin 61a, which is connected with the oscillating plate 62a, is rotated around the shaft 52a; the light shading plate for enlargement 51a crosses the optical axis 30 at an angle; and the light flux at the central portion of the optical path is gradually shaded by the light shading plate for enlargement 51a. The foregoing angle is an angle which corresponds to the variable magnification ratio of the lens 18a, and shows the shaded light amount in which the light amount distribution on the peripheral surface of the photoreceptor 12 is made uniform by an area of the light shading plate for the enlargement copy 51a which is projected onto the surface perpendicular to the optical axis 30. In FIG. 7 and FIG. 8, two-dotted chain lines show the light shading plate for enlargement copy 51a by which the shaded light amount is maximum at the time of the maximum magnification ratio or near the maximum magnification ratio.

Reversely, when the magnification ratio is smaller than the life-size magnification ratio, the light amount of the peripheral portions is apt to be increased as the magnification ratio is decreased. Accordingly, the increased light amount is shaded by rotating the light shading plate for reduction 51b as shown in FIG. 9 and FIG. 10, and is corrected to about the same amount as the light amount at the optical axis portion, so that the light amount distribution characteristic on the peripheral surface of the photoreceptor 12 is flat. The foregoing operations of the light shading plate for reduction 51b differ from those of the light shading plate for enlargement 51a by only its rotational direction, and other operations are the same as those of the light shading plate for enlargement 51a, so that explanations for the operations of the light shading plate for reduction copy 51b will be omitted.

As described above, the exposure device of the first embodiment is structured as follows. A light source has the distribution characteristic of the light distribution which is uniform at the time of a predetermined magnification ratio when no shading is conducted; the light amount distribution on a photoreceptor is made uniform by one of a plurality of light shading plates at the magnification ratio larger than a predetermined magnification ratio; and the light amount distribution on the photoreceptor is made uniform by the other of a plurality of light shading plates at the magnification ratio smaller than a predetermined magnification ratio. Accordingly, a rate of change of the distribution characteristic of the light distribution of the light source can be small, and variation of the entire light amount when the magnification ratio is varied, can be small. Further, since no shading can be conducted at a predetermined magnification ratio, the appropriate entire light amount and the superior distribution of the light distribution can be obtained at all magnification ratios.

Further, an exposure device of the second embodiment is structured as follows: a light shading member rotation mechanism is provided by which information of the shape is given according to the movement of a lens movement mechanism in the direction perpendicular to the optical axis. Accordingly, the size of a cam device for light distribution correction can be made smaller than that of the cam device which is moved with movement of the lens movement mechanism in the optical direction. Further, the inferior light distribution correction caused by deviations of the focal distance of a lens can be removed.

Further, an exposure device of the third embodiment is structured as follows: an oscillating plate is connected with the light shading member in the manner that the radius of rotation of the oscillating plate is larger than that of the light shading member. Accordingly, even when the oscillation is small, the rotation angle of the light shading member connected with the oscillating plate can be large, so that the exposure device having a light shading member rotation mechanism, the size of which is smaller than heretofore, and the structure of which is more simple, can be provided.

What is claimed is:

1. An exposure device comprising:
   (a) a light source for imagewise exposing an original document;
   (b) an optical path regulating member for regulating a cross section of an optical path from the light source, said optical path regulating member comprising a slit through which an imagewise light is passed to form an image on a photoreceptor;
   (c) a lens provided on the optical path between the original document and said photoreceptor, the optical path having an optical axis;
   (d) a lens moving mechanism, for moving said lens both in a direction of the optical axis of the optical path and in a direction perpendicular to the optical axis direction, to vary a magnification of the lens;
   (e) a light shading member rotatable around a shaft, said light shading member being provided in a direction perpendicular to the optical axis direction and in a direction of the cross-section of the optical path, a center of said shaft being perpendicular to the optical axis of said optical path and being in parallel with a longitudinal direction of said slit;
   said light shading member comprising two thin light shading plates, each thin light shading plate being thinner than said light shading member and being integrally provided in said light shading member, a length at adjacent portions of each of said two light shading plates in a width direction of the cross section of the optical path being unevenly changed; and
   (f) a light shading member rotating mechanism for rotating said light shading member in accordance with a magnification ratio provided by said lens moving mechanism;
   wherein when shading is absent, said light source has an even light distribution property at a predetermined magnification ratio for a position on a surface of said photoreceptor; and wherein:
   when a surface of one of said two light shading plates is protected on the optical path at an angle crossing the optical axis and a magnification ratio larger than said predetermined magnification ratio is selected, a shape projected by said one of said light shading plates on a surface perpendicular to the optical axis is formed so that the light amount distribution on the photoreceptor is made uniform by means of said light shading member rotating mechanism; and
   when a surface of the other one of said two light shading plates is projected on the optical path at another angle crossing the optical axis and another magnification ratio smaller than said predetermined magnification ratio is selected, a shape projected by said other one of said two light shading plates on the surface perpendicular to the optical axis is formed so that the light amount distribution on the photoreceptor is made uniform by means of said light shading member rotating mechanism.

2. The exposure device of claim 1, wherein said light shading member rotating mechanism comprises cam means for providing shape information of said two light shading plates in accordance with a movement of:
   said lens moving mechanism in said direction perpendicular to the optical axis;
   a follower of said cam means; and
   a moving means connected to said two light shading plates for rotating each of said two shading plates.

3. The exposure device of claim 2, wherein said moving means comprises an oscillating plate.

4. An exposure device comprising:
   (a) a light source for imagewise exposing an original document;
   (b) an optical path regulating member for regulating a cross section of an optical path from the light source, said optical path regulating member comprising a slit through which an imagewise light is passed to form an image on a photoreceptor;
   (c) a lens provided on the optical path between the original document and said photoreceptor, the optical path having an optical axis;
   (d) a lens moving mechanism, for moving said lens both in a direction of the optical axis of the optical path and in a direction perpendicular to the optical axis direction, to vary a magnification of the lens;
   (e) a light shading member rotatable around a shaft, said light shading member being provided in a direction perpendicular to the optical axis direction and in a direction of the cross-section of the optical path;
   said light shading member comprising two thin light shading plates, each thin light shading plate being thinner than said light shading member and being integrally provided in said light shading member, a length at adjacent portions of each of said two light shading plates in a width direction of the cross section of the optical path being unevenly changed; and
   (f) a light shading member rotating mechanism for rotating said light shading member in accordance with a magnification ratio provided by said lens moving mechanism;
   wherein when shading is absent, said light source has an even light distribution property at a predetermined magnification ratio for a position on a surface of said photoreceptor; and wherein:
   when a surface of one of said two light shading plates is projected on the optical path at an angle crossing the optical axis and a magnification ratio larger than said predetermined magnification ratio is selected, a shape projected by said one of said light shading plates on a surface perpendicular to the optical axis is formed so that the light amount distribution on the photoreceptor is made uniform by means of said light shading member rotating mechanism; and
   when a surface of the other one of said two light shading plates is projected on the optical path at another angle crossing the optical axis and another magnification ratio smaller than said predetermined magnification ratio is selected, a shape projected by said other one of said two light shading plates on the surface perpendicular to the optical axis is formed so that the light amount distribution on the photoreceptor is made uniform by means of said light shading member rotating mechanism;
   said light shading member rotating mechanism comprising cam means for providing shape information of said two light shading plates in accordance with a movement of:
   said lens moving mechanism in said direction perpendicular to the optical axis;
   a follower of said cam means; and a moving means comprising an oscillating moving plate connected to said light shading member for rotating each of said two light shading plates;

said oscillating plate having a rotational center which is provided in a direction perpendicular to the optical axis and in parallel with said shaft positioned adjacent to the optical axis, said rotation center being positioned on a side of said lens, and wherein a connection point of said oscillating plate and said light shading member with respect to said shaft is positioned on a side opposite to the rotation center of said oscillating plate.

* * * * *